(12) United States Patent
Mackin et al.

(10) Patent No.: US 8,897,972 B2
(45) Date of Patent: Nov. 25, 2014

(54) HARVESTER LOAD CONTROL SYSTEM

(75) Inventors: Ryan P. Mackin, Milan, IL (US); Daniel J. Burke, Cordova, IL (US); Bruce A. Coers, Hillsdale, IL (US); Alan D. Sheidler, Moline, IL (US); Glenn E. Pope, Viola, IL (US)

(73) Assignee: Deere & Company, Moline, IL (US)

( * ) Notice: Subject to any disclaimer, the term of this patent is extended or adjusted under 35 U.S.C. 154(b) by 1376 days.

(21) Appl. No.: 12/470,593

(22) Filed: May 22, 2009

(65) Prior Publication Data

US 2010/0293911 A1    Nov. 25, 2010

(51) Int. Cl.
    *G06F 19/00*    (2011.01)
    *A01D 34/00*    (2006.01)
    *A01D 69/02*    (2006.01)
    *A01D 41/127*   (2006.01)

(52) U.S. Cl.
    CPC .......... *A01D 69/025* (2013.01); *A01D 41/1274* (2013.01)
    USPC ............................................. 701/50; 56/10.6

(58) Field of Classification Search
    USPC ........................ 701/50; 56/10.2 R, 10.6, 10.7, 56/13.5–13.8
    See application file for complete search history.

(56) References Cited

U.S. PATENT DOCUMENTS

| | | | | |
|---|---|---|---|---|
| 3,690,395 | A | * | 9/1972 | Spiller et al. ................. 180/6.48 |
| 4,392,393 | A | * | 7/1983 | Montgomery .................. 74/661 |
| 4,448,157 | A | * | 5/1984 | Eckstein et al. ....... 123/142.5 R |
| 6,427,107 | B1 | * | 7/2002 | Chiu et al. ....................... 701/50 |
| 6,474,068 | B1 | * | 11/2002 | Abdel Jalil et al. ............. 60/716 |
| 6,745,117 | B1 | * | 6/2004 | Thacher et al. ................. 701/50 |
| 7,013,646 | B1 | * | 3/2006 | Serkh et al. ..................... 60/698 |
| 7,152,705 | B2 | * | 12/2006 | Alster et al. ............. 180/65.245 |
| 2005/0079949 | A1 | * | 4/2005 | Suzuki .............................. 477/2 |
| 2006/0086076 | A1 | | 4/2006 | Krone et al. |
| 2007/0130950 | A1 | * | 6/2007 | Serkh et al. ..................... 60/698 |
| 2009/0031721 | A1 | * | 2/2009 | Palo ................................. 60/449 |
| 2009/0233664 | A1 | * | 9/2009 | Sheidler et al. ................ 460/119 |
| 2009/0233759 | A1 | * | 9/2009 | Sheidler et al. .................... 477/3 |
| 2009/0308036 | A1 | * | 12/2009 | Sheidler ......................... 56/10.7 |
| 2010/0152981 | A1 | * | 6/2010 | Nishi et al. ...................... 701/50 |
| 2010/0286861 | A1 | * | 11/2010 | Mackin et al. .................. 701/29 |
| 2010/0293912 | A1 | * | 11/2010 | Mackin et al. ............. 56/10.2 R |
| 2010/0293913 | A1 | * | 11/2010 | Mackin et al. ............. 56/10.2 R |

FOREIGN PATENT DOCUMENTS

| | | | |
|---|---|---|---|
| DE | 3439710 A1 | | 5/1986 |
| GB | 709777 | * | 6/1954 |
| JP | 57076263 A | * | 5/1982 |
| JP | 2001320805 A | | 11/2001 |

OTHER PUBLICATIONS

European Search Report, dated Aug. 18, 2010 (5 pages).

* cited by examiner

*Primary Examiner* — Robert Pezzuto
*Assistant Examiner* — Joan D Misa

(57) ABSTRACT

A method of controlling a multiengine harvester including the steps of operating the harvester in a first mode, operating the harvester in a second mode, and selecting less than all of the power absorbing loads to be driven. In the first mode, the harvester is operated using a first engine and a second engine to drive the plurality of power absorbing loads. In the second mode, the harvester is operated with the second engine being uncoupled from all of the power absorbing loads. In the selecting step, less than all of the power absorbing loads are selected to be driven dependent upon the sensed load on the first engine while operating in the second mode. The first engine is incapable of driving all of the power absorbing loads.

18 Claims, 3 Drawing Sheets

HARVESTER LOAD CONTROL SYSTEM

BACKGROUND OF THE INVENTION

1. Field of the Invention

The present invention relates to work machines, and, more particularly, to energy load control systems for multiple engine driven harvesters.

2. Description of the Related Art

A work machine, such as an agricultural machine in the form of a harvester, typically includes a prime mover in the form of an internal combustion (IC) engine. The IC engine may either be in the form of an compression ignition engine such as a diesel engine, or a spark ignition engine, such as a gasoline engine. For most heavy work machines, the prime mover is in the form of a diesel engine having better lugging, pull down, and torque characteristics for work operations than the gasoline engine.

An IC engine in a harvester provides input power to a transmission, which in turn is coupled with drive axles through a differential gear system. The transmission, rear end differential, and rear axles are sometimes referred to as the power train of the work machine.

It is known to provide multiple engines on a harvester with electrical generators and various electrical motors. IC engines and electric motors are used to drive hybrid vehicles, and it is known to use regeneration techniques such that the generator/electric motor generates electrical power when the vehicle is executing a braking maneuver. Dual engines or even an engine having a dual crankshaft system is used to power vehicles having a transmission coupled thereto for transferring the driving torque of at least one of the engine or crankshafts to the motor/generator of the vehicle. The dual engine system utilizes both engines when additional load levels are required, such as during acceleration, climbing a hill, or pulling a heavy load. It is also known to utilize an electric motor to assist in providing the torque when additional increased loads are applied to the IC engine.

When running an agricultural machine on one engine, it is easy for the operator to overload the engine by trying to do too much with the power available. Overloading an engine can increase wear on the engine and the loads, such as a threshing system, if it is under driven. Further, overloading an engine can result in premature failure of the engine and even stalling of an engine particularly at a critical time when the power is most needed.

What is needed in the art is a control system that will manage a harvester power requirements while operating on one engine.

SUMMARY OF THE INVENTION

The invention in one form is directed to a multiengine agricultural harvester including a plurality of power absorbing loads, a first engine, a second engine, and a controller. The first engine is configured to supply power to a portion of a plurality of power absorbing loads. The first engine is not capable of powering all of the plurality of power absorbing loads. The second engine is uncoupled from the plurality of power absorbing loads. The controller is configured to select less than all of the power absorbing loads to be driven dependent upon a sensed load on the first engine.

The invention in another form is directed to a method of controlling a multiengine harvester including the steps of operating the harvester in a first mode, operating the harvester in a second mode, and selecting less than all of the power absorbing loads to be driven. In the first mode, the harvester is operated using a first engine and a second engine to drive the plurality of power absorbing loads. In the second mode, the harvester is operated with the second engine being uncoupled from all of the power absorbing loads. In the selecting step, less than all of the power absorbing loads are selected to be driven dependent upon the sensed load on the first engine while operating in the second mode. The first engine being incapable of driving all of the power absorbing loads.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplifications set out herein illustrate one embodiment of the invention and such exemplifications are not to be construed as limiting the scope of the invention in any manner.

DETAILED DESCRIPTION OF THE INVENTION

Figure 1:
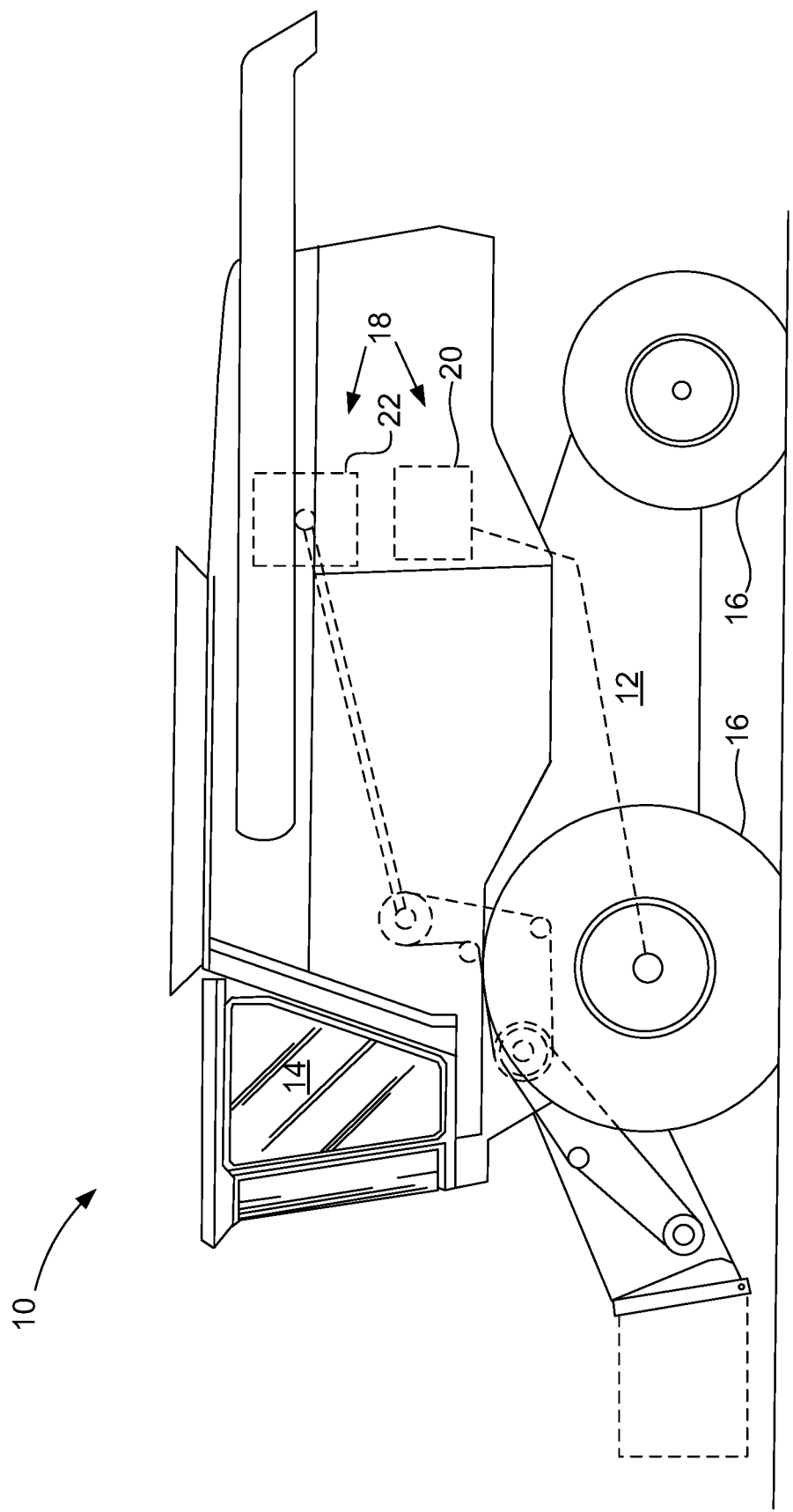
FIG. 1 is a side view of a harvester utilizing an embodiment of the energy control system of the present invention.

Referring now to the drawings, and more particularly to FIG. 1, there is shown an agricultural vehicle 10, also more particularly illustrated as a harvester 10, which includes a chassis 12, cabin/controls 14, wheels 16 and a power system 18 that include an engine 20 and an engine 22. Harvester 10 has a variety of mechanical and electrical systems therein including a crop gathering header that directs crop material to a threshing section. The threshing section separates the grain from other crop material and directs the grain to a sieve area for further separation of the grain from the lightweight crop material. The grain is then conveyed to a storage area for later conveyance to a grain transport vehicle.

Chassis 12 provides structural integrity and support for harvester 10 and is used to support mechanical and electrical systems therein. Controls 14 allow an operator the ability to direct the functions of harvester 10. Wheels 16 support chassis 12 and allow a propulsion system to move harvester 10 as directed by the operator using controls 14.

Figure 2:
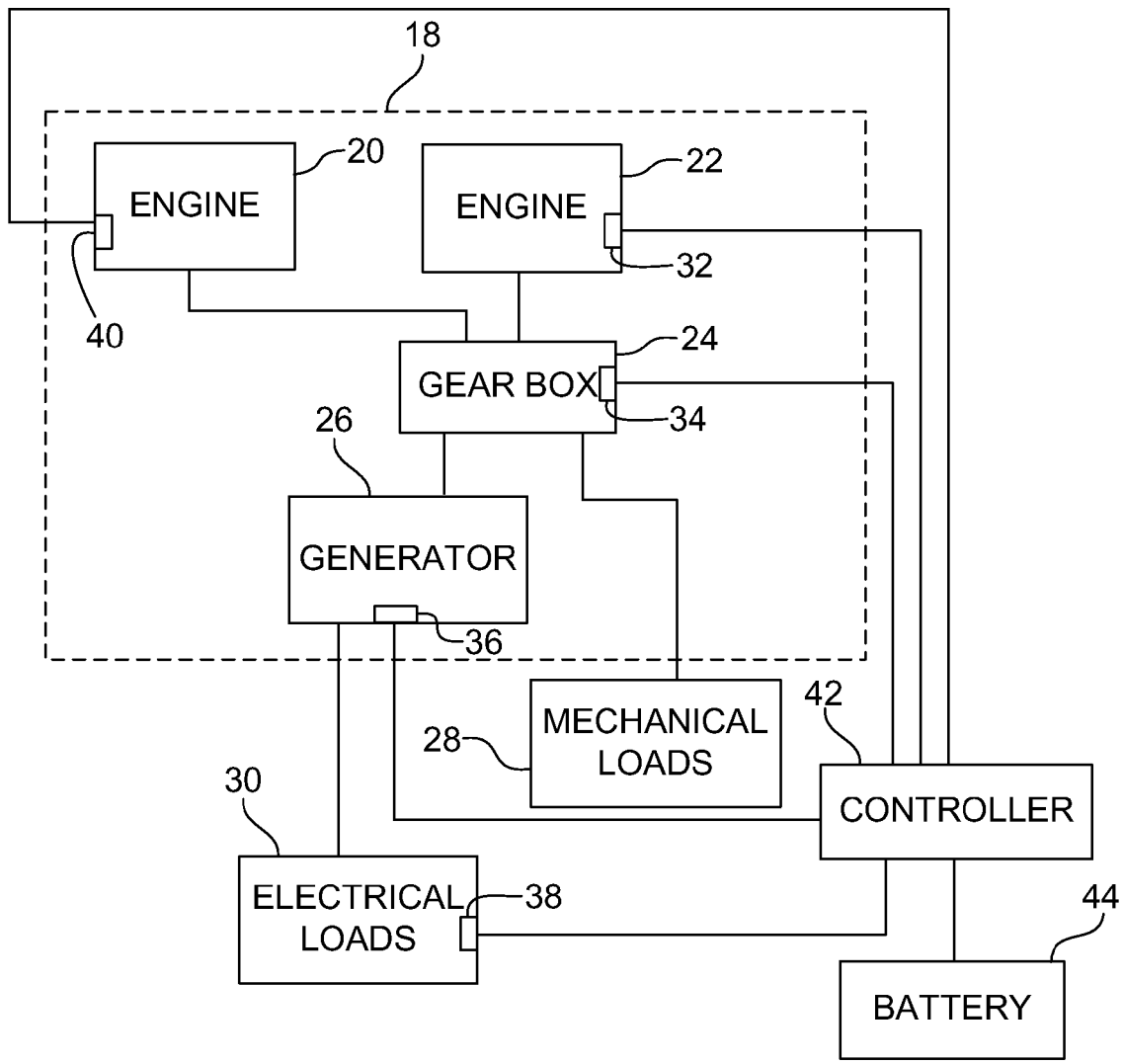
FIG. 2 is a schematical block diagram representing the multiple engine load control system of FIG. 1.

Now, additionally referring to FIG. 2, power system 18 includes engines 20 and 22 that are connected to a gear box 24, which in turn drives mechanical loads 28 and generator 26. Generator 26 in turn supplies electrical power to electrical loads 30. For ease of illustration, engine 20 and engine 22 are shown being connected to a gearbox 24, the connection of which being severable in a fashion in which engine 20 or engine 22 may be uncoupled from gearbox 24. Although gearbox 24 is illustrated, it is to be understood that this may include a transmission, clutch, and other mechanical linking devices. Further, although illustrated as one gearbox driven by engines 20 and 22, separate mechanical structures may also be utilized with the gearboxes driving separate generators and mechanical loads with perhaps a mechanical linkage between gearboxes. It is also contemplated that engines 20 and 22 may each drive separate generators in lieu of gear box 24, with the coupling, and uncoupling being carried out using electrical components.

An engine load sensor/control 32, a gearbox sensor/control 34, a generator sensor/control 36, an electrical load sensor/control 38, and an engine sensor/control 40 are each interconnected to a controller 42. Controller 42 is interconnected to the sensor/controls to provide interactive control so that elements of the various electrical loads 30 and mechanical loads 28 can be effectively driven if either engine 20 or 22 is uncoupled and/or shut off. Controller 42 has been illustrated as a stand alone controller for the sake of clarity, and for the explanation of the present invention; however, it is also to be understood that the functions of controller 42 can be undertaken by a controller utilized for other functions in harvester 10. Although the interlinking between controller 42 and other elements are shown as a single line, these lines are intended to convey the understanding that information, control commands, and/or power may be routed therebetween by instructions issued by controller 42. Battery 44 can also be thought of an additional electrical load when it is being charged and a source of power when it is being discharged.

Engines 20 and 22 are internal combustion engines that are connected to gearbox 24. Gearbox 24 mechanically drives generator 26 as well as mechanical loads 28. The description of mechanical loads 28 is not to infer that there is not a mechanical linkage between generator 26 and gearbox 24, but rather signifies that there is an additional mechanical load that is assigned to be driven by power system 18. For example, mechanical loads 28 may include a grain separation mechanism within harvester 10 as well as propulsion and hydraulic systems for harvester 10. The loads can be individually coupled and the power requirements measured by way of sensor/control 34. Also, various electrical loads 30 can be selectively engaged or disengaged by control/sensor 38.

Figure 3:
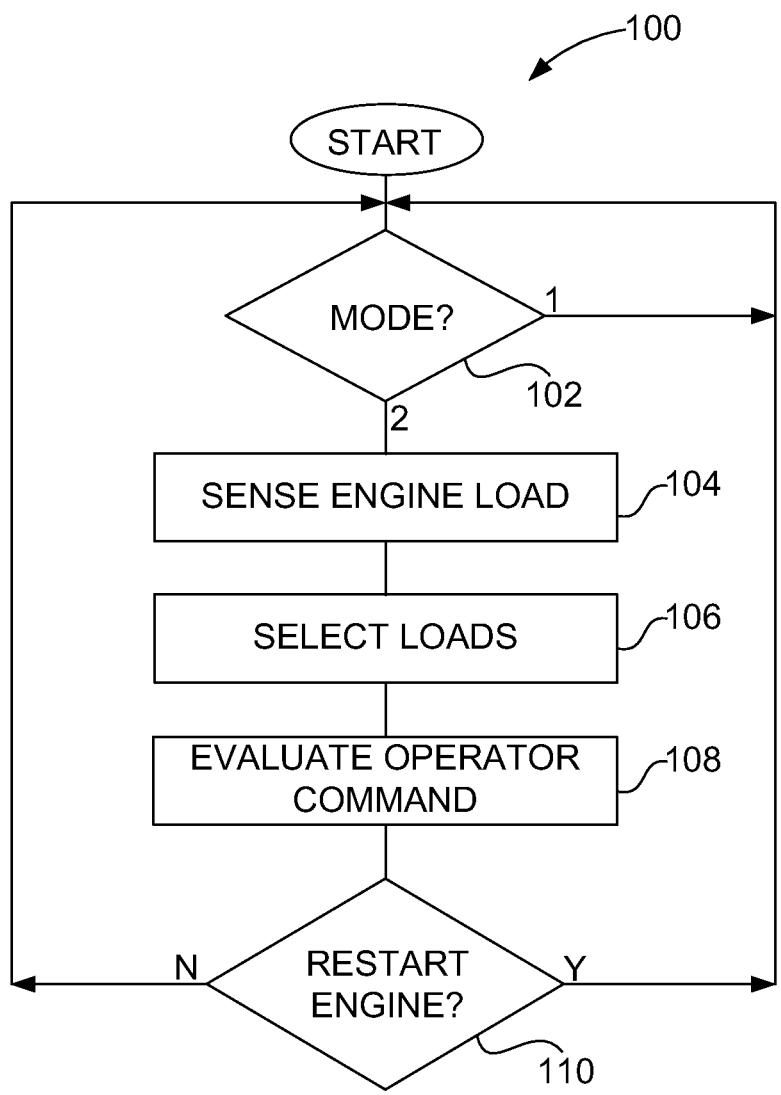
FIG. 3 is a schematical block diagram of an embodiment of a load control method used in the multiple engine energy control system of FIGS. 1 and 2.

Now, additionally referring to FIG. 3, there is illustrated a method 100 in which, power system 18 can operate in a first mode with both engines 20 and 22 operating, wherein method 100, by way of decision box 102, simply returns to the starting point. In mode 2, engine 22 is uncoupled so that it no longer drives gearbox 24 or provides any power that can be used to drive electrical loads 30 or mechanical loads 28. In mode 2, engine 20 is operating, providing power to gearbox 24, although engine 20 is incapable of driving all possible mechanical loads 28 and electrical loads 30 of harvester 10. At step 104 the load on engine 20 is determined and is based on the sensed engine load. Controller 42 operatively selects mechanical loads 28 and electrical loads 30 at step 106 so that engine 20 is not overloaded. At step 108, method 100 evaluates operator commands issued with controls 14 wherein the operator of harvester 10 is engaging different aspects of harvester 10 to perform the desired function.

The evaluation of operator commands and operations being undertaken by harvester 10 can be handled by controller 42 in different manners. In one embodiment of the present invention, the evaluation undertaken at step 108 can result in a decision of controller 42, at step 110, to start engine 22. Once this decision is made then method 100 returns to step 102 and will remain there in mode 1, until the loads reduce to a level where engine 20 can supply all of the needs of harvester 10, then mode 2 is selected.

In another embodiment of the present invention, the commands that are evaluated are compared to a priority of operations. For example, if the operator issues a command of a low priority, then the evaluation is such that the engine capability and the engine load, measured at step 104, are used to determine if the additional lower priority load can be accommodated. If the commanded load can be accommodated, then it is engaged by controller 42. If the command issued by the operator is such that it would cause an overload on engine 20 then controller 42 will not execute the command issued by the operator. Further, if the command issued by the operator is a higher priority than engaged load of a lower priority, then lower priority loads may be disengaged and the load commanded to be engaged by the operator is then engaged by controller 42.

If the engine power in the primary engine is insufficient, when the operator initiates a "Primary" power use, which is determined by an order of importance of key harvester functions. Secondary power users, which are power users that are not critical to harvester functions, are downgraded to receive a lower amount of power, or completely turned off, until controller 42 brings the second engine on line to supply adequate power for all uses. The present invention is configured to always have power available for critical harvester functions. For example, if the operator desires to engage the threshing mechanism, controller 42 may disregard that command since the threshing system would require more horsepower than the capability of engine 20 alone and still have sufficient power to move and function other aspects of harvester 10. If the operator issues a command to extend the grain auger and to begin auguring the grain as harvester 10 is moving along, controller 42 may disengage the air conditioning system or other low priority function so that grain contained in the hopper may be off loaded.

It is also contemplated that commands issued by the operator at step 108 may be partially complied with by controller 42 which may select time periods for different portions of loads 28 and 30 to be engaged for specific periods of time and then different loads are engaged other periods of time. For example, the load on engine 20 is such that charging a battery 44 and operating an air conditioning system for the cabin may be alternated so that battery 44 may be charged for a predetermined time, such as one minute, then the air conditioning system can be driven in the cabin for a two minute period followed by running of a blower fan in the cabin for three minutes.

Combinations of the foregoing are also contemplated. For example a priority system can be utilized while engine 22 is started and is brought up to speed, then all the commanded loads are engaged. In this manner the transition to multi-engine power is undertaken with the stalling of one engine being avoided. It is also contemplated that controller 42 can select which engine is shut down and uncoupled based on engine parameters such as capability as well as measured performance. Visual displays of these operations are presented to the operator so that the operator is given operational information to among other things reduce impatience of the operator if commands are denied or delayed until the second engine comes online.

Loads that are driven, in the form of loads 28 and 30, may include such things as propulsion of harvester 10, harvesting function loads, such as the threshing section or the separating section. Any harvester parameter indicative of a load can be monitored, at step 104, by controller 42 interacting with the various controls and sensors. Such load indicators can include the fuel delivery rate to engine 20, the engine torque being supplied by engine 20, pressure of the hydrostatic system of harvester 10, the electrical current drain of a particular electrical load 30 which may be used to drive a hydraulic system or other systems in harvester 10 or even an attitude of harvester 10 indicating an anticipated load or lack thereof as harvester 10 is moved along the ground.

The present invention advantageously allows the operator to drive and operate harvester 10 while harvester 10 automatically adjusts power being supplied by engine 20 so as to keep engine 20 from stalling. This improves overall performance as the operator can, for example, travel to a destination during a road transport faster, while still saving a great deal of fuel that would have been consumed by running both engines 20 and 22. This more optimal use of engines 20 and 22 allow the environmental aspects of the engines to work at higher efficiency since engine 20's load is being managed so that it is not being over driven and engine 22 is shut off so that it no longer contributes to an environmental processing load.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A multi-engine agricultural harvester, comprising:
a plurality of power absorbing loads;
a first engine configured to supply power to a portion of said plurality of power absorbing loads, said first engine not being capable of powering all of said plurality of power absorbing loads;
a second engine; and
a controller configured to function in a plurality of modes including a first mode and a second mode, said controller functioning in said first mode using said first engine and said second engine to drive said plurality of power absorbing loads, said controller functioning in said second mode when said second engine is uncoupled from all of said power absorbing loads, said controller being further configured to select less than all of said power absorbing loads to be driven by said first engine while operating in said second mode dependent upon a sensed load on said first engine.

2. The multi-engine harvester of claim 1, further comprising at least one sensor being configured to sense at least one of a fuel delivery rate to said first engine, an engine torque of said first engine, a pressure in a hydrostatic system, an electrical power demand and an attitude of the harvester.

3. The multi-engine harvester of claim 1, wherein said controller continuously selects less than all of said power absorbing loads thereby preventing said first engine from stalling as a result of overloading.

4. The multi-engine harvester of claim 1, wherein said plurality of loads include a propulsion load and a harvesting load.

5. The multi-engine harvester of claim 1, wherein said controller is further configured to evaluate control selections made by an operator while operating in said second mode and selecting which of said power absorbing loads to power dependent upon said control selections.

6. The multi-engine harvester of claim 5, wherein said controller is further configured to compare said control selections with a load priority table.

7. The multi-engine harvester of claim 5, wherein said controller is further configured to time limit a delivery of power to some of said plurality of loads.

8. The multi-engine harvester of claim 1, wherein said controller is further configured to start said second engine dependent upon a command by an operator to engage a selected one of said plurality of power absorbing loads.

9. The multi-engine harvester of claim 8, wherein said controller is further configured to delay an engagement of said selected one of said plurality of power absorbing loads until said second engine is online.

10. A method of controlling a multi-engine harvester, comprising the steps of:
operating the harvester in a first mode using a first engine and a second engine to drive a plurality of power absorbing loads;
operating the harvester in a second mode with said second engine being uncoupled from all of said power absorbing loads; and
selecting less than all of said power absorbing loads to be driven by said first engine dependent upon a sensed load on said first engine while operating in said second mode, said first engine being incapable of driving all of said power absorbing loads.

11. The method of claim 10, wherein said sensed load includes a sensing of at least one of a fuel delivery rate to said first engine, engine torque of said first engine, pressure in a hydrostatic system, electrical power demand and attitude of the harvester.

12. The method of claim 10, wherein said selecting step is continuously re-executed thereby preventing said first engine from stalling as a result of overloading.

13. The method of claim 10, wherein said plurality of loads include at least one of a propulsion load and a harvesting load.

14. The method of claim 10, further comprising the step of evaluating control selections made by an operator while operating in said second mode and re-executing said selecting step dependent upon said control selections.

15. The method of claim 14, wherein said evaluating step includes comparing said control selections with a load priority table.

16. The method of claim 14, wherein said selecting step includes timing a delivery of power to some of said plurality of loads.

17. The method of claim 10, further comprising the step of starting said second engine dependent upon a command by an operator to engage a selected one of said plurality of power absorbing loads.

18. The method of claim 17, further comprising a step of delaying an engagement of said selected one of said plurality of power absorbing loads until said second engine is online.

* * * * *